United States Patent
Zlotnick

(10) Patent No.: US 7,890,756 B2
(45) Date of Patent: Feb. 15, 2011

(54) VERIFICATION SYSTEM AND METHOD FOR ACCESSING RESOURCES IN A COMPUTING ENVIRONMENT

(75) Inventor: Aviad Zlotnick, D.N. Lower Galilee (IL)

(73) Assignee: International Business Machines Corporation, Armonk, NY (US)

( * ) Notice: Subject to any disclaimer, the term of this patent is extended or adjusted under 35 U.S.C. 154(b) by 1128 days.

(21) Appl. No.: 11/423,978

(22) Filed: Jun. 14, 2006

(65) Prior Publication Data
US 2007/0294530 A1 Dec. 20, 2007

(51) Int. Cl.
*H04L 9/00* (2006.01)
(52) U.S. Cl. ...................................... 713/167
(58) Field of Classification Search .................. 713/167; 726/11, 22; 9/167
See application file for complete search history.

(56) References Cited

U.S. PATENT DOCUMENTS

| | | | |
|---|---|---|---|
| 5,421,006 A | 5/1995 | Jablon et al. | |
| 5,974,549 A | 10/1999 | Golan | |
| 2003/0212906 A1 | 11/2003 | Arnold et al. | |
| 2005/0091655 A1* | 4/2005 | Probert et al. | 718/100 |
| 2005/0268112 A1 | 12/2005 | Wang et al. | |
| 2006/0101408 A1* | 5/2006 | Kotamarthi et al. | 717/126 |

OTHER PUBLICATIONS

Zonelabs http://download.zonelabs.com/bin/media/pdf/zaav60_datasheet.pdf.

* cited by examiner

*Primary Examiner*—Ellen Tran

(57) ABSTRACT

A software package in accordance with one embodiment comprises a software application, and a declaration of operation associated with the software application. The declaration of operation is examined by a system module running on the computing system. The system module is configured to control access requests submitted by the software application after software application is installed on the computing system. The system module monitors a request for accessing a resource accessible via the computing system. The system module grants the software application access to the resource, in response to determining that the request for access complies with the declaration of operation.

19 Claims, 4 Drawing Sheets

VERIFICATION SYSTEM AND METHOD FOR ACCESSING RESOURCES IN A COMPUTING ENVIRONMENT

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

FIELD OF INVENTION

The present invention relates generally to monitoring and controlling access to system resources in a computing environment and, more particularly, to a system and method for monitoring and controlling a software application's access to system resources based on a declaration of operation.

BACKGROUND

Trojan horses, viruses and worms are forms of logic code that can be executed on a computing system without the authorization of the system's user. The execution of such malicious code often results in the performance of unwanted operations on the computing system. Thus, the malicious code can harm user data (e.g., corrupt or erase data or file systems) and/or invade the user's privacy (e.g., collect and transport confidential data).

In some instances, a user may monitor system performance and access to system resources by way of special tools (e.g., Norton Antivirus™, Microsoft Windows Defender™). These tools can detect malicious code and prevent its execution. Most of these tools can also remove malicious code from an infected computing system and repair the system if needed.

A disadvantage of the above conventional tools is that these tools are only effective against malicious code that has been discovered. In other words, the conventional tools can only prevent the execution of a malicious code, only after the code has infected a plurality of systems, and after experts have identified and analyzed the code to provide a countermeasure.

Consequently, undiscovered malicious codes often continue to infect computing environments and can illicitly access system resources for some time, until they are discovered and removed. In most instances, the conventional tools are ineffective unless they are updated and executed frequently, so that they can detect and remove newly developed malicious code. Regretfully, the conventional tool cannot guarantee that an infected system can be cleaned or that lost or damaged data can be restored.

With the proliferation of the Internet as a medium for sharing software tools and resources, a great deal of software is now readily available for download. Most downloadable software genuinely perform operations that only access resources intended for their particular use. Unfortunately, there are also imposter software downloads that include malicious code that (instead or in addition to performing the proclaimed tasks) access resources that are not authorized by the user.

As such, cautious users generally limit themselves to downloading known software from trusted sources that can provide certificates of authenticity (e.g., Authenticode). Unfortunately, not all software is available for download through trusted sources. Further, a certificate of authenticity only declares that the software is provided through a particular vendor and makes available a digital signature for verification by a user.

Most users typically are not sophisticated enough to use this information for verification purposes. In case of a more sophisticated user, if the user is unfamiliar with a particular vendor, the user cannot be sure that downloading the software application is safe, even if the digital signature for that vendor is verifiable. Thus, in many instances, a user's options are limited to either risking exposure by downloading potentially hazardous software from untrusted or unknown sources; or alternatively not downloading the software at all.

Neither of the above options is plausible. Therefore, methods and systems are needed that can overcome the aforementioned shortcomings.

SUMMARY

The present disclosure is directed to a system and corresponding methods that facilitate monitoring a software application's request for access to system resources in a computing environment.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method for controlling access to system resources in a computing system is provided. The method comprises providing a declaration of operation ("DOO") to a system module (e.g., an operating system) configured to control access requests submitted by a software application running over the computing system. The system module monitors the software application's requests for access to a resource, and grants such access if the request complies with the DOO. The system module may deny an access request, on the other hand, if it determines the access request fails to comply with the DOO.

In one embodiment, the system module, based on permissions set forth in the DOO, grants one type of request (e.g., a read request) to access a given resource, while it denies another type of access request (e.g., a write request) to the same resource. The DOO may comprise information about the scope of the resources accessible to the software application; and/or resources that are not to be accessed by the software application. A user can modify the DOO and thus the scope of access to one or more resources, during or after the installation of the software application on the computing system.

In one embodiment, the DOO may be stored in a local storage medium (e.g., a hard drive), or a removable storage medium (e.g., a flash drive) depending on implementation. Preferably, a software application's access requests may be processed, after the removable storage medium is connected to the computing system, so that the removable storage medium can serve as a key to provide or limit access to one or more resources for a particular application.

In accordance with another embodiment, a software package for controlling access to computing system resources is provided. The software package preferably comprises a software application installation image and a DOO. The DOO is examined by a system module running on the computing system. The system module is configured to control access requests submitted by the software application after software application is installed on the computing system.

In yet another embodiment, a computer program product comprising logic code embedded in a computer readable medium is provided. The logic code is executed by a microcontroller to cause a computer to monitor one or more requests submitted by a software application to access one or more resources accessible via the computer. The software application's request to access the one or more resources is granted, in response to determining that the request complies with a DOO associated with the application software.

The logic code may be executed by the microcontroller to further cause the computer to deny the software application's request to access a resource, in response to determining that the access request fails to comply with the DOO.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION

The present disclosure is directed to systems and corresponding methods that facilitate monitoring access to system resources in a computing environment. A software package, in accordance with one embodiment, comprises a software application and a declaration of operation (DOO) associated with the software application.

The DOO is examined by the computing system's operating system during installation to determine which resources may or may not be accessed by the software application. The operating system grants the software application access to the resources, in response to determining that the request for access complies with the DOO.

By way of example, the invention has been disclosed in the following as applicable to an operating system implemented to monitor and control access to system resources. It is noteworthy, however, that in alternative embodiments, other system modules or software units (e.g., a virtual machine, a hypervisor, etc.) may be utilized, either independently or in joint cooperation with the operating system, to monitor and control access to system resources.

In the following, numerous specific details are set forth to provide a thorough description of various embodiments of the invention. Certain embodiments of the invention may be practiced without these specific details or with some variations in details. In some instances, certain features are described in less detail so as not to obscure other aspects of the invention. The level of detail associated with each of the elements or features should not be construed to qualify the novelty or importance of one feature over the others.

Figure 1:
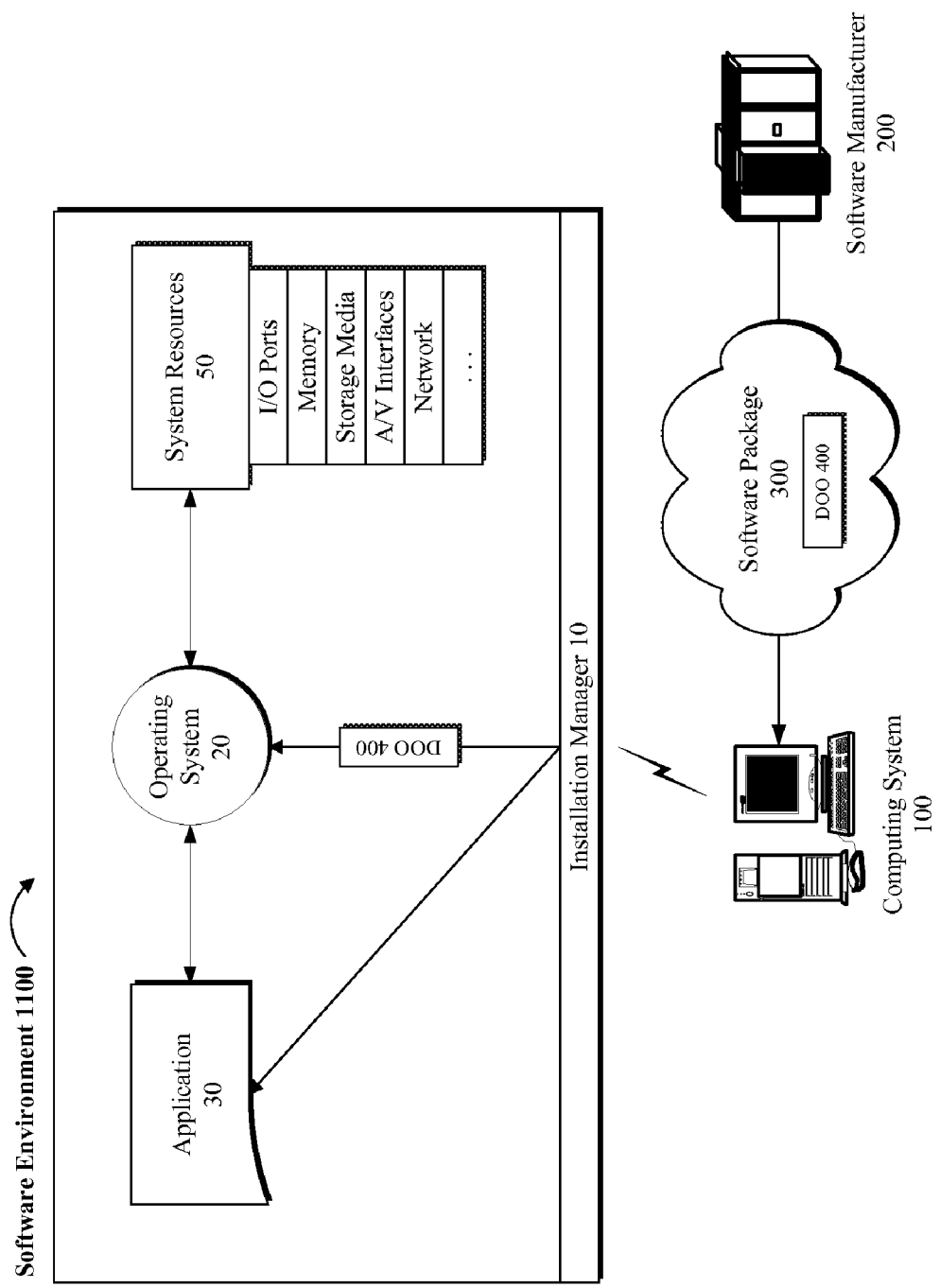
FIG. 1 illustrates an exemplary computing environment for monitoring access to system resources in the computing environment, in accordance with one or more embodiments of the invention.

Referring to FIG. 1, a computing environment in accordance with an exemplary embodiment is provided, wherein a computing system 100 is configured to install a software package 300 provided by a software vendor or manufacturer 200. The software package 300 may be transmitted to computing system 100 over a data communications network, or as embedded in a computer readable medium such as a CD ROM, flash drive or other suitable media.

Software package 300 comprises logic code for a software application 30 ("application 30") and preferably DOO 400. DOO 400 is associated with application 30 in a manner that allows an operating system 20, running on computing system 100, determine access permissions for application 30. That is, DOO 400 includes information about the nature and type of resources that application 30 needs to access in order to properly operate. In addition or alternatively, DOO may comprise information about the type and nature of resources application 30 may not need to operate.

In certain embodiments, further permission or access details are provided that identify the manner a resource may be accessed or utilized by application 30. Thus, for example, while one type of access request (e.g., a read access) to a resource may be permitted, another type of access request (e.g., a write access) to the same resource may be denied. Accordingly, based on the information included in DOO 400, operating system 20 can make a determination to grant or deny an access request submitted by application 30.

For the purpose of example, if application 30 is text processing software, then DOO 400 may indicate that application 30 will need to read and write from computing system's 100 storage media. As such, access requests submitted by application 30 that are unrelated to reading from or writing to the storage media are not granted, if operating system 20 detects that such access requests are not within the scope of the DOO 400.

Typically, a text processing software has no need to directly transmit data files to another computer on the network. So DOO 400 for the text processing application 30 will not authorize a request to transmit data over a network port. Thus, such a request will not be granted. As another example, DOO 400 may indicate that text processing application 30 can access printing resources (e.g., printers) that are locally attached to computing system 100, but not printing resources that are connected to a local area network (e.g., remote printers).

As yet another example, if application 30 is a stop watch utility for keeping track of time spent on a certain project, then DOO 400 may indicate that application 30 will need to read from computing system's 100 storage media, but not write to it. Thus, if application 30 attempts to write to a storage media, such access is not granted by operating system 20. Other classes of restriction may be also configured for the system.

That is, DOO 400 and operating system 20 may be configured to monitor and control certain operations in more detail. For example, a user may be able to configure the system so that a limited percentage (e.g., 10%) of network accesses by application 30 is directed to transmitting or receiving data. In this manner, access requests submitted beyond a threshold quota will be denied by operating system 20.

As another example, the system can be configured to allow application 30 to perform certain operations on particular resources every so often. For example, DOO 400 for application 30 may provide that operating system 20 is not to allow more than X number of read or write operations from a particular resource (e.g., a local disk) within a predefined time period (e.g., every 10 hours, between 8 am and 5 pm, etc.).

Yet, in another example, the system may be configured to limit access by application 30 to certain resources based on the resource content or type. For example, application 30 may be limited to accessing text-based files and not executable files. Or, even more particularly, application 30 may be limited to accessing a file created by a particular software (e.g., MS Word™, MS Excel™, etc.)

Figure 2:
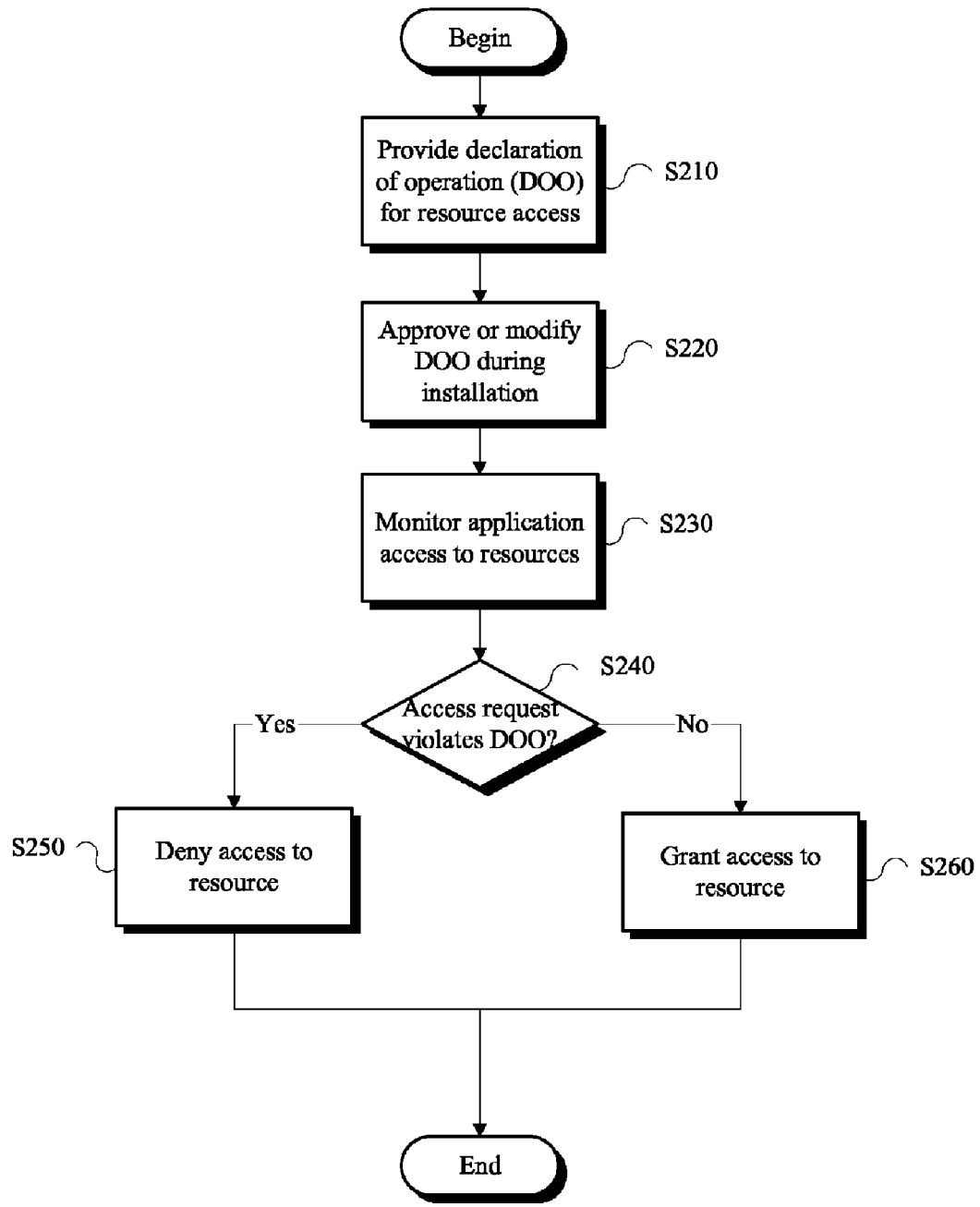
FIG. 2 is a flow diagram of a method for verifying an application's request for access to system resources, in accordance with one embodiment.

Referring to FIG. 2, in one embodiment, when software package 300 (including an installable image of application 30) is provided to computing system 100, a DOO 400 associated with application 30 is also provided as a part of software package 300. To indicate the resources that can or cannot be accessed by application 30 (S210). DOO 400 may be embedded in software package 300, for example, in a recordable medium such as a CD ROM. Alternatively, DOO 400 may be separately provided, for example, by an on-line distributor when software package 300 is being downloaded.

At the time of installation, installation manager 10 is loaded into memory of computing system 100. Installation manager 10 is configured to set up and monitor the installation process for software package 300. In one embodiment, installation manager 10 provides to a user the access details for application 30 according to DOO 400. The user will thus be given the option to approve or modify DOO 400 during the installation process (S220).

For example, if software package 300 comprises a text processing application 30, then installation manager 10 after examining DOO 400 may prompt the user with the definition or scope of resources that may be accessed by application 30. In an exemplary embodiment, a list of resources for computing system 100 may be provided to the user, such that the user can select each resource that should be made accessible (or not accessible) to application 30.

Depending on implementation, other mechanisms may be configured to allow a user to authorize or limit access to one or more resources for each software that is installed on computing system 100. Once DOO 400 has been approved or modified according to the user input, DOO 400 is stored for future reference by operating system 20. In one embodiment, DOO 400 is stored on a local storage medium such as computing system 100's hard drive.

In alternative embodiments, DOO 400 may be stored on a flash memory device, for example, that can be directly or wirelessly connected to an I/O port of computing system 100. In this manner, application's 30 request to access a resource can be processed when the flash memory device is connected to computing system 100. Thus, the flash memory device can be used as a key that can provide or limit access to one or more resources on computing system 100 for a specific application 30.

It is noteworthy that storage mechanisms other than a flash memory device may be utilized to achieve the results contemplated herein, without detracting from the course and scope of the present invention. Exemplary embodiments of such mechanisms may include an external drive, a computing device with a storage medium, a pointing device with a storage medium, a personal digital assistance (PDA), an audio or video player, etc. Accordingly, any of the above devices may be used to record DOO 400.

Referring back to FIG. 2, when application 30 is loaded into computing system's 100 memory and executed, operating system 20 resident in memory of computing system 100 monitors application's 30 request for access to resources (S230). As such, operating system 20 determines whether an access request by a specific application violates DOO 400 (S240). It is noteworthy that operating system 20 may monitor several DOOs 400 at a time, wherein each DOO 400 is associated with a corresponding application 30 running on computing system 100.

If an access request submitted by application 30 violates the provisions of DOO 400 associated with application 30, then operating system 20 prevents application 30 from accessing to the resource (S250). If the access request does not violate DOO 400, then application 30 is granted access to the resource (S260). In this manner, operating system 20 monitors application's 30 scope of access to system resources based on the permissions and specifications in DOO 400.

In one embodiment, the user during the installation process is notified of the type and scope of the access permissions in DOO 400, and is given the opportunity to modify the permissions for application 30. As such, the user will not need to personally monitor the access requests submitted by application 30. Preferably, if there is a violation of DOO 400, operating system 20 automatically detects and reports the violation to the user.

In one embodiment, a query may be presented to the user that provides more details about an unauthorized access request and prompts the user with certain options. The user can then determine the proper action that needs to be taken, based on the generated details and options. For example, in certain embodiments, the user is given the option to modify DOO 400 for each application both during and after the installation process has been completed.

Thus, if the user is suspicious about the authenticity of an application or whether the application poses a danger, the user may set DOO 400 to allow no or minimal access to system resources. At a later time, when the user has verified the authenticity of the installed application, then the user can modify DOO 400 to broaden the scope of access to system resources.

In certain embodiments, DOO 400 may be configured not only for each application 30, but it can be also configured for each user of computing system 100, for example. In this manner, different users that use the same application 30 may be given a predetermined degree of access to various system resources 50. The same principal can be applied to network users that operate a networked application to access resources remotely coupled to the network.

In yet another embodiment, DOO 400 may be used in conjunction with behavior blocking tools that monitor different applications 30 running on computing system 100 to detect unusual behavior patterns. In such an embodiment, two applications with same behavior can be associated with two different DOOs 400. Preferably, each DOO can override the active behavior blocking tool, so that the two applications may be given access to different sets of resource 50 or as otherwise desired.

In different embodiments, the invention can be implemented either entirely in the form of hardware or entirely in the form of software, or a combination of both hardware and software elements. For example, computing system 100 may comprise a controlled computing system environment that can be presented largely in terms of hardware components and software code executed to perform processes that achieve the results contemplated by the system of the present invention.

Figure 3A:
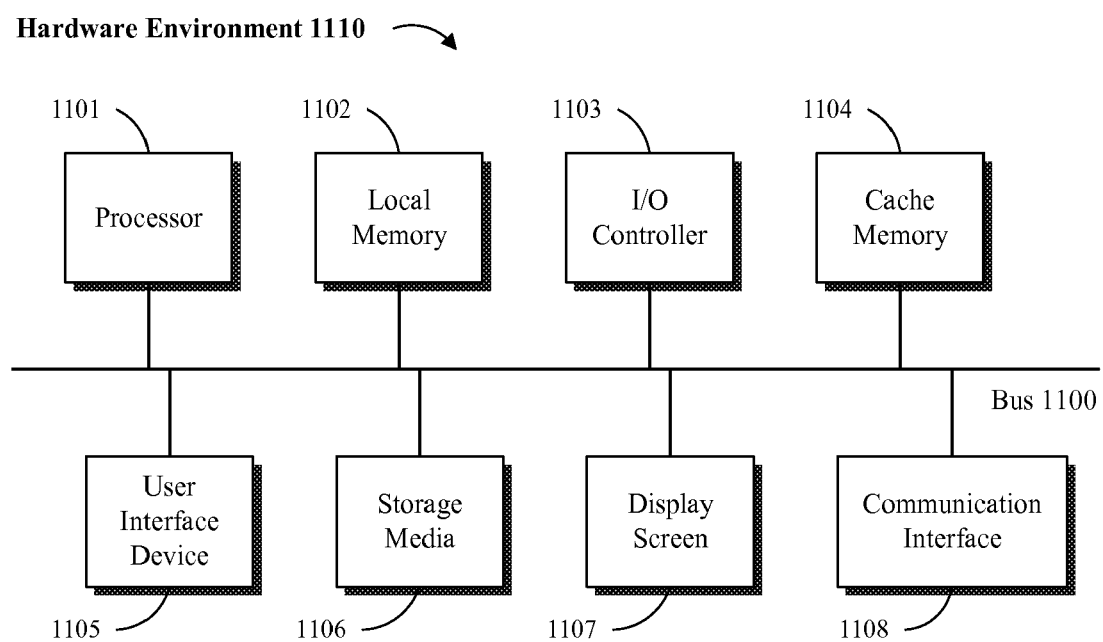
FIGS. 3A and 3B are block diagrams of hardware and software environments in which a system of the present invention may operate, in accordance with one or more embodiments.
Figure 3B:
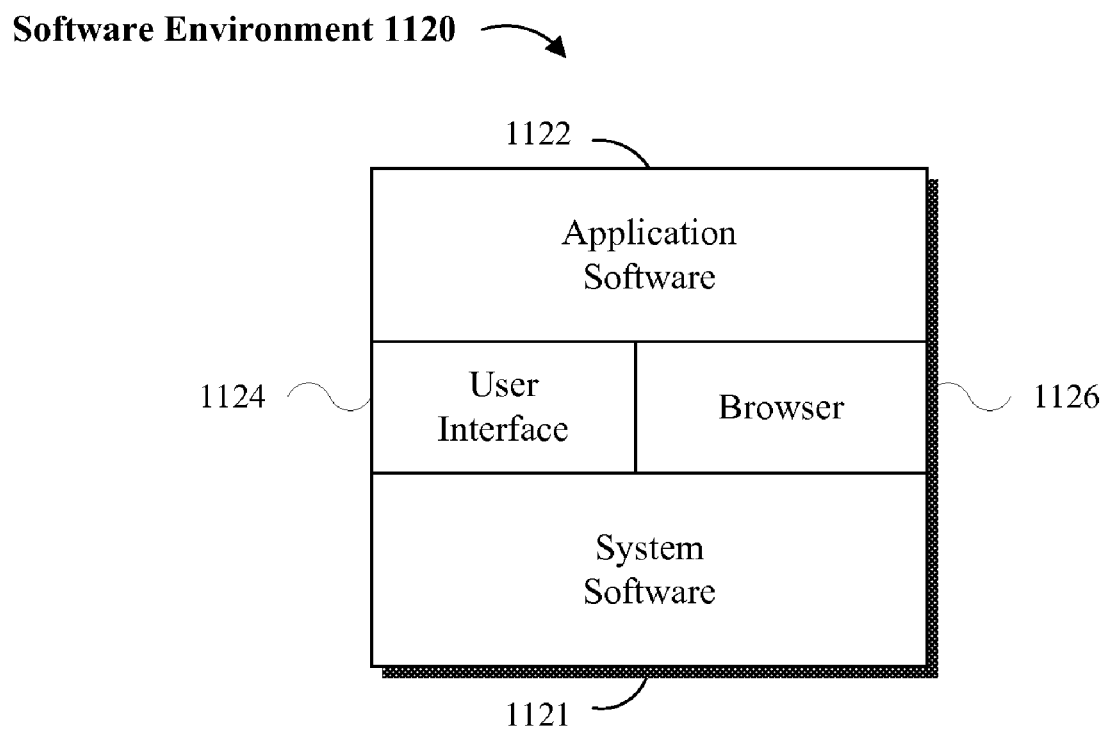

Referring to FIGS. 3A and 3B, a computing system environment in accordance with an exemplary embodiment is composed of a hardware environment 1110 and a software environment 1120. The hardware environment 1110 comprises the machinery and equipment that provide an execution environment for the software; and the software provides the execution instructions for the hardware as provided below.

As provided here, the software elements that are executed on the illustrated hardware elements are described in terms of specific logical or functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 1120 is divided into two major classes comprising system software 1121 and application software 1122. System software 1121 comprises control programs, such as the operating system (OS) and information management systems that instruct the hardware how to function and process information.

In one embodiment, operating system 20 is implemented as system software 1121 and application 30 is implemented as application software 1122 executed on one or more hardware environments, as provided earlier. System software 1121 and application software 1122 may comprise, but are not limited to program code, data structures, firmware, resident software, microcode or any other form of information or routine that may be read, analyzed or executed by a microcontroller or microprocessor.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

The computer-readable medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital video disk (DVD).

Referring to FIG. 3A, an embodiment of the application software 1122 can be implemented as computer software in the form of computer readable code executed on a data processing system such as hardware environment 1110 that comprises a processor 1101 coupled to one or more memory elements by way of a system bus 1100. The memory elements, for example, can comprise local memory 1102, storage media 1106, and cache memory 1104. Processor 1101 loads executable code from storage media 1106 to local memory 1102. Cache memory 1104 provides temporary storage to reduce the number of times code is loaded from storage media 1106 for execution.

A user interface device 1105 (e.g., keyboard, pointing device, etc.) and a display screen 1107 can be coupled to the computing system either directly or through an intervening I/O controller 1103, for example. A communication interface unit 1108, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 1110 may not include all the above components, or may comprise other components for additional functionality or utility. For example, hardware environment 1110 can be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In some embodiments of the system, communication interface 1108 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 3B, application software 1122 can comprise one or more computer programs that are executed on top of system software 1121 after being loaded from storage media 1106 into local memory 1102. In a client-server architecture, application software 1122 may comprise client software and server software. For example, in one embodiment of the invention, client software is executed on computing terminal 100 and server software is executed on a server machine.

Software environment 1120 may also comprise browser software 1126 for accessing data available over local or remote computing networks. Further, software environment 1120 may comprise a user interface 1124 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective steps of each method are performed are purely exemplary. Depending on implementation, the steps can be performed in any order or in parallel, unless indicated otherwise in the present disclosure. Further, the logic code is not related or limited to any particular programming language, and may comprise of one or more modules that execute on one or more processors in a distributed, non-distributed or multi-processing environment.

The present invention has been described above with reference to exemplary features and embodiments. Those skilled in the art will recognize, however, that changes and modifications may be made in these embodiments without departing from the scope of the present invention. These and various other adaptations and combinations of the embodiments disclosed are within the scope of the invention and are further defined by the claims and their full scope of equivalents.

What is claimed is:

1. A method for controlling access to resources in a computing environment, the method comprising:

processing a declaration of operation associated with a software application, in response to determining that the software application is being installed on a computing system, wherein the software application is included in a software package comprising logic code for the software application and the declaration of operation, wherein the declaration of operation provides one or more permissions for the software application to access one or more resources in the computing environment, such that an operating system running on the computing system utilizes the one more permissions information included in the declaration of operation for the software application to determine what type of access the software application may have to the resources in the computing environment, wherein the one or more permissions are modifiable by a user of the computing system at the time of installation or after the installation of the software application, such that the user is able to designate scope and type of access to said one or more resources, wherein the declaration of operation is processed by a system module executed over the computing system, the system module configured to control access requests submitted by the software application after the software application is installed on the computing system, wherein the system module monitors a first request submitted by the software application to access a first resource in the computing environment, wherein the system module grants the first request, in response to determining that the first request complies with the declaration of operation associated with the software application, thereby allowing the software application to access the first resource, and wherein the one or more permissions are set so that if different users use the same software application, each user is given access to different resources when using the software application.

2. The method of claim 1, wherein the system module prohibits the software application from accessing the first resource by denying the first request, in response to determining that the first request fails to comply with the declaration of operation.

3. The method of claim 1, wherein the system module, based on said one or more permissions, allows the software application to access the first resource by granting a first type of access request, and prohibits the software application from accessing the first resource by denying a second type of access request.

4. The method of claim 1, wherein the one or more permissions comprise information about the software application's scope of access to the one or more resources.

5. The method of claim 1, wherein the one or more permissions comprise information about the software application's limitations for accessing the one or more resources.

6. The method of claim 1, wherein the one or more permissions are modifiable, when the software application is being installed on the computing system.

7. The method of claim 1, wherein the declaration of operation is stored in a removable storage medium, such that the system module monitors access requests submitted by the software application, in response to the removable storage media being connected to the computing system.

8. The method of claim 7, wherein the removable storage medium is a flash drive.

9. The method of claim 1, wherein the system module is an operating system executing over the computing system.

10. A software package configured for installing a software application on a computing system, the software package stored on a computer readable storage medium with non-transient properties, the software package comprising:

a software application wherein the software application is included in a software package comprising logic code for a software application and the declaration of operation, and a declaration of operation associated with the software application, wherein the declaration of operation is examined by a system module running on the computing system, the system module configured to control access requests submitted by the software application to access one or more resources after software application is installed on the computing system, wherein one or more access permissions are set based on the declaration of operation such that the system module running on the computing system utilizes the one more access permissions included in the declaration of operation for the software application to determine what type of access the software application may have to the resources in the computing system, wherein said one or more access permissions are modifiable by a user of the computing system at the time of installation or after the installation of the software application, such that the user is able to designate scope and type of access to said one or more resources, wherein the system module monitors a request for accessing a resource accessible via the computing system, wherein the system module grants the software application access to the resource, in response to determining that the request for access complies with the declaration of operation associated with the software application, and wherein the one or more permissions are set so that if different users use the same software application, each user is given access to different resources when using the software application.

11. The software package of claim 10, wherein the system module denies the software application access to the resource, in response to determining that the access request fails to comply with the declaration of operation.

12. The software package of claim 10, wherein the system module based on permissions set forth in the declaration of operation grants the software application a first type of access to the resource and denies the software application a second type of access to the resource.

13. The software package of claim 10, wherein the declaration of operation is modifiable by a user of the software application during installation of the software application on the computing system.

14. The software package of claim 10, wherein the declaration of operation comprises information about the software application's scope of access to the resource.

15. A computer program product comprising logic code embedded in a non-transient computer readable storage medium having a computer readable program stored thereon, wherein the logic code is executed by a microcontroller to cause a computer to:

monitor one or more requests submitted by a first software application to access one or more resources accessible via the computer wherein the first software application is included in a software package comprising logic code and a declaration of operation for the first software application; and grant the first software application's request to access the one or more resources, in response to determining that the request complies with a first declaration of operation associated with the first application software, wherein one or more access permissions are set based on the declaration of operation such that an operating system running on the computing system utilizes one more access permissions information included in the declaration of operation for the first software application to determine what type of access the software application may have to resources in a computing environment wherein one or more permissions are modifiable by a user of the computing system at the time of installation or after the installation of the software application, such that the user is able to designate scope and type of access to said one or more resources, and wherein the one or more permissions are set so that if different users use the same software application, each user is given access to different resources when using the software application.

16. The computer program product of claim 15, wherein the logic code is executed by the microcontroller to further cause the computer to deny the first software application's request to access a resource, in response to determining that the access request fails to comply with the declaration of operation.

17. The computer program product of claim 15, wherein the logic code is executed by the microcontroller to further cause the computer to provide a user with an option to modify the declaration of operation, while the first software application is installed on the computer.

18. The computer program product of claim 15, wherein the logic code is executed by the microcontroller to further cause the computer to grant the first software application a first type of access to the resource and deny the first software application a second type of access to the resource based on the declaration of operation associated with the software application.

19. The computer program product of claim 15, wherein the declaration of operation comprises information about the software application's scope of access to the resource and wherein the declaration of operation is configured to limit access to a resource, rather than completely block access to a resource, by providing access to the resource at a predetermined level either quantitatively or temporally.

* * * * *